United States Patent [19]

Chapman

[11] 4,154,119
[45] May 15, 1979

[54] LINKAGE DEVICE FOR CONVERTING A HYDRAULIC VEHICULAR CLUTCH TO MECHANICAL OPERATION

[76] Inventor: Stephen A. Chapman, 607 Viscose Ave., Front Royal, Va. 22630

[21] Appl. No.: 798,207

[22] Filed: May 18, 1977

[51] Int. Cl.² ............................................. F16H 21/20
[52] U.S. Cl. ......................................... 74/47; 74/518; 192/99 S
[58] Field of Search ..................... 74/47, 66, 474, 518; 192/99 R, 99 S

[56] References Cited

U.S. PATENT DOCUMENTS

| | | | |
|---|---|---|---|
| 1,794,163 | 2/1931 | Follis | 74/474 |
| 1,848,896 | 3/1932 | Martindill | 74/518 |
| 1,904,151 | 4/1933 | Leyes | 74/518 X |
| 2,090,787 | 8/1937 | Eberhard | 192/99 R X |
| 2,514,002 | 7/1950 | Long | 74/474 X |
| 2,633,948 | 4/1953 | Neracher et al. | 192/91 R |
| 3,092,229 | 6/1962 | Uher | 192/91 R X |
| 3,314,511 | 4/1967 | Randol | 192/99 A |
| 3,433,340 | 3/1969 | Murakami | 192/91 R |
| 3,983,983 | 10/1976 | Steiskal et al. | 192/99 S |

Primary Examiner—Rodney H. Bonck
Attorney, Agent, or Firm—Pollock, VandeSande and Priddy

[57] ABSTRACT

A mechanical linkage device is provided for replacing the master and slave cylinders and associated parts in a hydraulic vehicular clutch system to convert the system to direct mechanical operation. The linkage device, provided in kit form and installable as a unit, is attached by welding to one end of the pre-existing cross shaft in the clutch system, and includes an elongated actuating rod one end of which is pivotally attached in the linkage device and the other end of which engages the throw-out fork of the clutch system in place of the pre-existing slave cylinder piston rod. The point of pivotal attachment can be varied relative to the axis of rotation of the cross shaft, and the effective length of the actuating rod can also be adjusted, to adapt the linkage device for proper installation and operation in a given vehicular clutch system.

7 Claims, 2 Drawing Figures

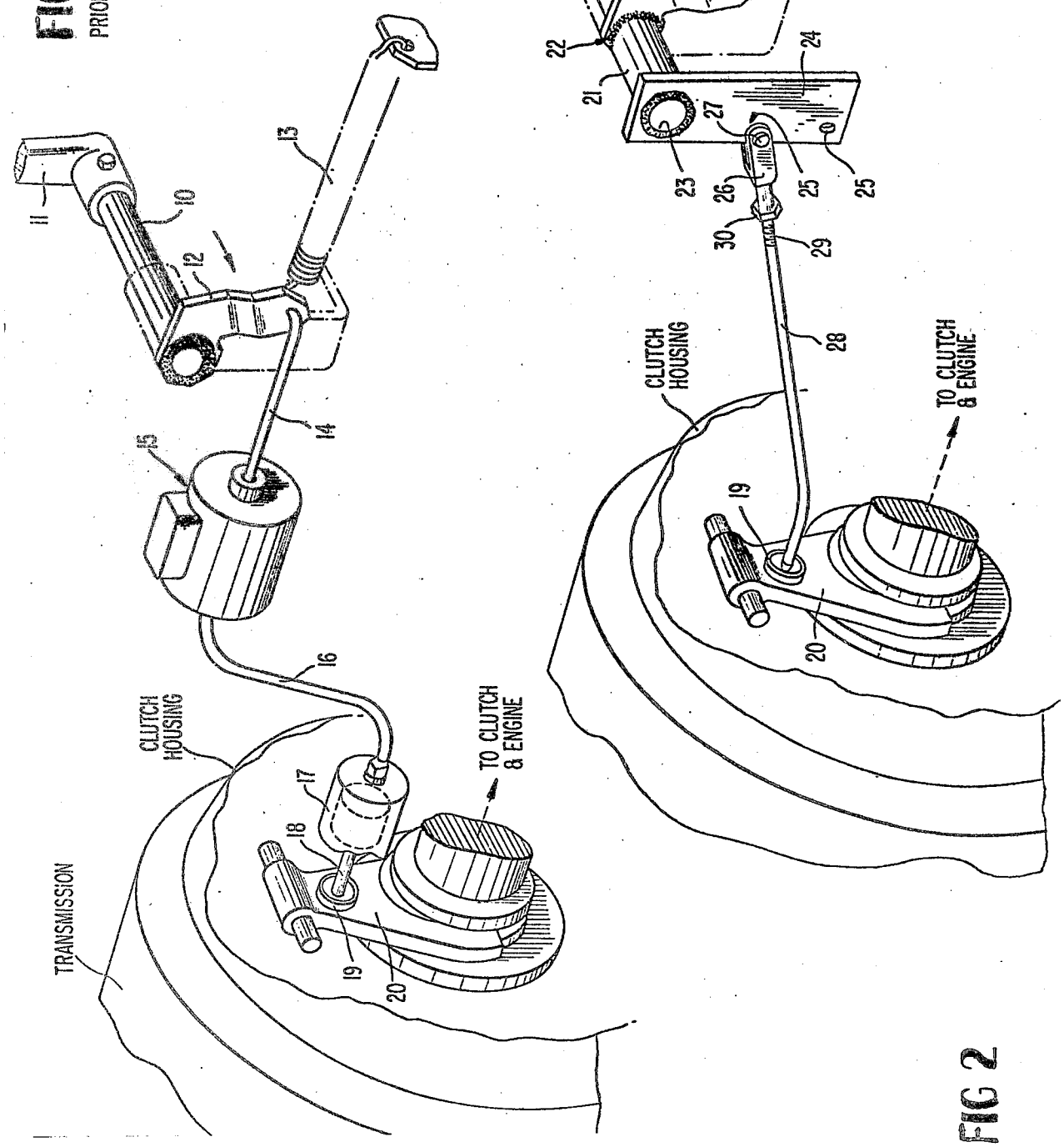

LINKAGE DEVICE FOR CONVERTING A HYDRAULIC VEHICULAR CLUTCH TO MECHANICAL OPERATION

BACKGROUND OF THE INVENTION

Various vehicular clutch systems of the hydraulic type have been suggested heretofore. In general, these systems include a pedal-operated rotatable cross shaft which has a small actuating rod attached thereto operative to control a clutch master cylinder, the output fluid of which in turn controls a slave cylinder which has a piston rod that engages a throw-out fork which operates to release the vehicle clutch. Such systems present a continuing maintenance problem, particularly in conjunction with vehicles such as delivery trucks which are subject to numerous start and stop operations. More particularly, after the vehicle has been operated for a period of time, the hydraulic system tends to develop leaks (or, in some cases, there may even be a rupture of a fluid line in the system), air bleeds into the system, and the system fails to operate properly to depress the throw-out fork thereby preventing release of the clutch and shifting of the vehicle gears. While these problems are correctable by appropriate repair procedures, and can be minimized by periodic maintenance procedures which include the replacement of deteriorating parts of the actuator system, such repair and maintenance procedures are time consuming and costly.

The present invention solves these problems through the provision of a mechanical linkage device, provided in kit form and installable as a unit at the time of a repair or maintenance operation, in replacement of the pre-existing hydraulic actuator in the vehicular clutch system to convert the pre-existing hydraulic clutch system into one which operates mechanically. The conversion linkage, when installed, eliminates all future repair and maintenance problems arising by reason of hydraulic system leaks or failures, and assures that depression of the clutch pedal in the vehicle and consequent rotation of the cross shaft depresses the throw-out fork to release the clutch reliably under extended and heavy service conditions.

SUMMARY OF THE INVENTION

The mechanical linkage device of the present invention is used in replacement of the pre-existing hydraulic actuator means in a vehicular clutch system of the hydraulic type, and is designed and dimensioned to be installed between the pre-existing cross shaft and throw-out fork in such a system. The linkage includes a first element, preferably taking the form of a short length of metallic pipe, which is adapted to be welded to one end of the cross shaft into substantially colinear relation thereto. This first element in turn supports a second element, preferably taking the form of an elongated rectangular plate disposed in a plane transverse to the axis of the first element, which has one or more holes therein adapted to receive a clevis and pin or other pivotal mechanism which, in turn, is attached to one end of an elongated actuating rod. The actuating rod has a length sufficient to extend continuously from its point of pivotal attachment to the cup-shaped abutment means in the throw-out fork that previously received the piston rod of the slave cylinder; and a short length of the elongated actuator rod adjacent the free end of said rod is preferably bent at an angle to the remainder of said rod to assure that the free end of the rod is directed into the said cup-shaped abutment at substantially right angles to the plane of the throw-out fork.

Depression of the clutch pedal in the vehicle, and consequent rotation of the cross shaft, effects a translational movement of the actuator rod which causes depression of the throw-out fork to release the clutch in the vehicle. The action is direct and, being entirely mechanical, achieves reliable and substantially maintenance-free clutch operation over a greatly extended service life.

In a preferred embodiment of the invention, the linkage device includes a plurality of holes which are differently spaced from the axis of rotation of the cross shaft when the linkage device is mounted thereon, and the pivotal end of the elongated actuating rod is adapted to be mounted for pivotal movement in any selected one of these holes to permit variation in the orientation of the actuating rod as well as to permit variation in the moment arm between the pivotal end of said rod and the axis of rotation of the cross shaft. In addition, the preferred embodiment of the invention preferably includes an elongated threaded section in the actuating rod adjacent the pivotally-mounted end thereof, to permit the actuating rod to be screwed any selected distance into an associated mounting element for purposes of adjusting the effective length of the actuating rod. These considerations permit the orientation and dimensions of the linkage to be varied as may be desired or necessary to achieve proper installation and appropriate operating characteristics of the linkage.

BRIEF DESCRIPTION OF THE DRAWINGS

The foregoing objects, advantages, construction and operation of the present invention will become more readily apparent from the subsequent description and accompanying drawings wherein:

FIG. 1 is a diagrammatic illustration of a vehicular clutch system of the hydraulic type which is adapted for conversion to mechanical operation by the linkage device of the present invention; and FIG. 2 is a diagrammatic illustration of the clutch system of FIG. 1 converted to mechanical operation by removal of the hydraulic actuator components and replacement thereof by the mechanical linkage device of the present invention.

DESCRIPTION OF THE PREFERRED EMBODIMENTS

FIG. 1 illustrates a prior art vehicular clutch system of the hydraulic type, which exhibits the repair and maintenance problems described previously, and which is adapted to be converted to mechanical operation by installation of the linkage device of the present invention for purposes of correcting or eliminating such problems. The pre-existing clutch system includes a rotatably mounted cross shaft 10 adapted to be pedal-operated by the operator of the vehicle through an element generally designated 11. The cross shaft 10 has a downwardly depending arm 12 welded to one end thereof which is engaged by an elongated return spring 13. Arm 12 also supports a comparatively short actuating rod 14 which is used to control the master cylinder 15 in the clutch system, and the fluid output line 16 from master cylinder 15 in turn controls operation of a smaller slave cylinder 17. The piston in slave cylinder 17 includes an outwardly projecting piston rod 18 which has its free end seated in a cup-like abutment 19 formed on the throw-out fork 20 of the clutch system.

Rotation of cross shaft 10 in the direction indicated by the arrow adjacent thereto against the forces of spring 13 causes rod 14 to depress master cylinder 15 thereby forcing hydraulic fluid out of the master cylinder through line 16 into slave cylinder 17; and the resultant extension of piston rod 18 depresses the throw-out fork 20 to release the clutch. When the pedal force applied to cross shaft 10 is removed, the pressure in the clutch cooperating with a return spring (not shown) on the throw-out fork causes the clutch to re-engage, and the fluid in the slave cylinder 17 returns to the master cylinder 15. This operation, and the actual structural configuration of the elements employed to achieve it, is all well known to those skilled in the art and has been illustrated and described in a diagrammatic and general fashion only to facilitate an understanding of the conversion linkage to which the present invention is directed.

As will be apparent from FIG. 1, the hydraulic actuator disposed between cross shaft 10, 12 and throw-out fork 20 includes a number of interconnected and cooperating components any one of which may be subject to wear and deterioration after a period of use. In accordance with the present invention, the problems resulting from such wear or deterioration are corrected and/or eliminated by removal of all of elements 14–18 inclusive from the pre-existing hydraulic clutch system, and by replacement of said removed elements with a mechanical linkage device that operates, upon rotation of cross shaft 10, to achieve the desired depression of throw-out fork 20. The mechanical linkage device of the present invention consists of an arrangement adapted to be fixedly attached to the cross shaft 10, and having an elongated actuating rod which is mounted for pivotal motion at a location displaced from the axis of rotation of shaft 10 whereby rotation of said shaft 10 effects a translational movement of the actuating rod, the length of said rod being sufficient to extend to the throw-out fork 20 for engagement in the cup-shaped abutment 19 thereof so that such translational movement of the rod effects depression of the throw-out fork through direct mechanical engagement therewith. It will be appreciated that this type of operation can be achieved by various mechanical configurations, but the preferred such configuration is shown in FIG. 2.

The linkage device, which is manufactured and installable as a unit in place of the pre-existing hydraulic actuator, consists of an attachment element 21 preferably taking the form of a short length of iron pipe which is adapted to be welded at one end thereof, as at 22 to one end of cross shaft 10. The other end of pipe 21 is inserted into a complementarily sized opening 23 adjacent one end of an elongated, generally rectangular metal plate 24, and is welded thereto around both faces of plate 24 so that plate 24 together with element 21 are fixedly secured to cross shaft 10 for rotation therewith.

Plate 24 depends downwardly from cross shaft 10 and is oriented in a plane transverse to the axis of rotation of the cross shaft. A plurality of pivotal attachment points are provided by plate 24 which, in the preferred embodiment of the invention, comprise a plurality of holes 25 that are spaced respectively at different distances from the axes of elements 21 and 10. A clevis 26 is provided with a clevis pin 27 that is adapted to pass through any selected one of the holes 25 and adapted to be retained in the selected hole for pivotal motion therein by means of a cotter pin (not shown) on the remote side of plate 24. An elongated actuating rod 28 includes a threaded section 29 at one end thereof for thread engagement with the clevis 26. Rod 28 is adapted to be screwed a variable but selected distance into clevis 26 to adjust the effective length of rod 28, and a jam nut 30 is provided for locking the rod 28 to clevis 26 at the selected adjusted length. A comparatively short length of rod 28, adjacent the free end thereof, is bent through an angle to the main direction of elongation of the rod to facilitate engagement of the free end of rod 28 with abutment 19 on throw-out fork 20 and to assure that the free end of the rod 28 extends into said abutment 19 at substantially right angles to the plane of fork 20.

In a preferred embodiment of the invention, pipe section 21 is approximately 3-⅛ inches long. Plate 24 is fabricated of iron and is substantially two inches wide and 6-½ inches long. Two ⅜ inch holes 25 are provided one of which has its center disposed substantially ¾ inch from the free end of plate 24 and ⅝ inch inward from one edge of said plate, and the other of which has its center located substantially 2-½ inches from the free end of plate 24 and ¾ of an inch from said one edge of plate 24. The overall length of rod 28 is substantially eleven inches, with an approximately 2-¾ inch length thereof adjacent the free end of the rod being bent through an angle of substantially 25° to the remainder of the rod. Clevis 26 is a standard ⅜ inch clevis (the plate 24 being substantially ¾0 inch thick), 1-⅝ inches deep from its center, and is fitted with a ⅜ inch clevis pin and an associated flat washer and cotter pin for retaining the clevis in any selected one of the holes 25.

The overall linkage is sold as a unit for after-market correction of a hydraulic clutch control failure. The different mounting holes 25, and the threaded section 29 on rod 28, permit ready adjustment of the effective orientation and length of the adjusting rod to assure that the free end of said rod fits into abutment 19 and moves straight into said abutment with a desired operating force.

While I have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention, I claim:

1. A replacement kit installable as a unit in a pre-existing hydraulic vehicular clutch system for converting said pre-existing clutch system from hydraulic to mechanical operation, the pre-existing hydraulic clutch system being of the type comprising a pedal-operated rotatable cross shaft, a clutch, a throw-out fork for selectively releasing the clutch, and removable hydraulic actuator means located between said cross shaft and said throw-out fork and comprising at least one hydraulic cylinder having a hydraulically operated piston rod in engagement with abutment means on said throw-out fork for moving said piston rod hydraulically relative to said abutment means on said throw-out fork upon rotation of said cross shaft thereby to control engagement and disengagement of the clutch, said replacement kit being adapted to be installed in said pre-existing vehicular clutch system upon removal of said hydraulic actuator means and in replacement of the removed hydraulic actuator means previously present in said clutch system for converting said pre-existing vehicular clutch system from hydraulic operation to direct mechanical operation, said replacement kit comprising an elongated metallic rod, attachment means for attaching one end of said rod to said cross shaft in the vehicle, said attachment means comprising a metallic member adapted to be welded to one end of said cross shaft to extend from said cross shaft in a direction colinear with the direction of extension of the cross shaft for rotation with said cross shaft, said replacement kit further including an attached plate extending from said metallic member in a direction transverse to the direction of extension of the cross shaft and having means pivotally engaging said one end of said elongated rod at a position radially displaced from the axis of rotation of said cross shaft and metallic member for converting rotary movement of said cross shaft into translational movement of said rod when said metallic member and said plate have been welded to said cross shaft, first adjustment means for selectively varying the radial displacement between said one end of said rod and the axis of rotation of said cross shaft at the time of installation of said replacement kit, second adjustment means for selectively varying the effective length of said rod at the time of installation of said replacement kit, the length of said rod being sufficient, when said replacement kit is attached to said cross shaft and adjusted by said first and second adjustment means, to extend continuously from said attachment means to the abutment means on said throw-out fork which previously received the piston rod of the removed hydraulic actuator means, a comparatively short length of said rod adjacent the other end of said rod being bent through an angle to the main direction of elongation of said rod to facilitate engagement of said other end of said rod with said abutment means on said throw-out fork in place of the pre-existing piston rod of the removed hydraulic actuator means.

2. The replacement kit of claim 1 wherein said first adjustment means comprises a plurality of pivotal attachment points on said plate which are spaced respectively at different distances from said metallic member and from the axis of rotation of said cross shaft, and mounting means adjacent said one end of said rod for engaging a selected one of said plurality of pivotal attachment points.

3. The replacement kit of claim 1 wherein said metallic member is tubular and adapted to be welded, at one end of said tubular member, to one end of said cross shaft, said plate comprising an elongated metallic plate one end of which is affixed to said tubular member adjacent the other end of said tubular member, at least one hole in said plate located at a position radially displaced from the axis of said tubular member, and a clevis attached to said one end of said rod and having a clevis pin adapted to pass through said hole for pivotally attaching said one end of said rod to said plate.

4. The replacement kit of claim 3 wherein said second adjustment means includes an elongated threaded section at said one end of said rod in thread engagement with said clevis to permit the effective length of said rod to be adjusted.

5. The replacement kit of claim 3 wherein said first adjustment means includes a plurality of holes in said plate which are respectively spaced at different distances from the axis of said tubular member, said clevis pin being adapted to pass through any selected one of said holes for pivotally attaching said one end of said rod to said plate at a selected distance from the axis of said tubular member.

6. The replacement kit of claim 1 including pivotal mounting means at said one end of said rod, said second adjusting means including an elongated threaded section at said one end of said rod in thread engagement with said mounting means and adapted to be screwed a selected distance into said mounting means for adjusting the effective length of said rod.

7. The replacement kit of claim 1 wherein said angle is substantially 25°.

* * * * *